United States Patent
Lee

(10) Patent No.: US 7,447,579 B2
(45) Date of Patent: Nov. 4, 2008

(54) METHOD FOR MEASURING ABSOLUTE STEERING ANGLE OF STEERING SHAFT OF VEHICLE

(75) Inventor: Jong-Hwa Lee, Seoul (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 707 days.

(21) Appl. No.: 11/002,280

(22) Filed: Dec. 3, 2004

(65) Prior Publication Data

US 2005/0159868 A1    Jul. 21, 2005

(30) Foreign Application Priority Data

Jan. 15, 2004   (KR)   ........................ 10-2004-0002902

(51) Int. Cl.
*G01B 5/24* (2006.01)

(52) U.S. Cl. .................. 701/41; 702/151; 180/6.2; 33/1 PT

(58) Field of Classification Search .............. 701/41; 702/151; 180/6.2; 33/1 PT
See application file for complete search history.

(56) References Cited

U.S. PATENT DOCUMENTS

| | | | | |
|---|---|---|---|---|
| 5,239,551 | A * | 8/1993 | Roberts et al. | ................. 372/57 |
| 5,930,905 | A | 8/1999 | Zabler | |
| 6,466,889 | B1 | 10/2002 | Schödlbauer | |
| 6,862,551 | B1 * | 3/2005 | Kang et al. | .................. 702/151 |
| 6,941,241 | B2 * | 9/2005 | Lee et al. | ..................... 702/151 |
| 7,050,895 | B2 * | 5/2006 | Lee et al. | ....................... 701/41 |

OTHER PUBLICATIONS

U.S. Appl. No. 10/748,152, filed Dec. 31, 2003.
U.S. Appl. No. 10/330,325, filed Dec. 30, 2002.
U.S. Appl. No. 10/748,151, filed Dec. 31, 2003.
U.S. Appl. No. 10/748,239, filed Dec. 31, 2003.
U.S. Appl. No. 11/002,284, filed Dec. 3, 2004.

* cited by examiner

*Primary Examiner*—Mark Hellner
(74) *Attorney, Agent, or Firm*—Greenblum & Bernstein, P.L.C.

(57) ABSTRACT

A method for measuring the steering angle of steering shaft for vehicle, wherein the steering angle of the steering shaft is measured by using two rotors rotating at a determined RPM ratio according to the rotation of the steering shaft.

7 Claims, 3 Drawing Sheets

[FIG. 1]
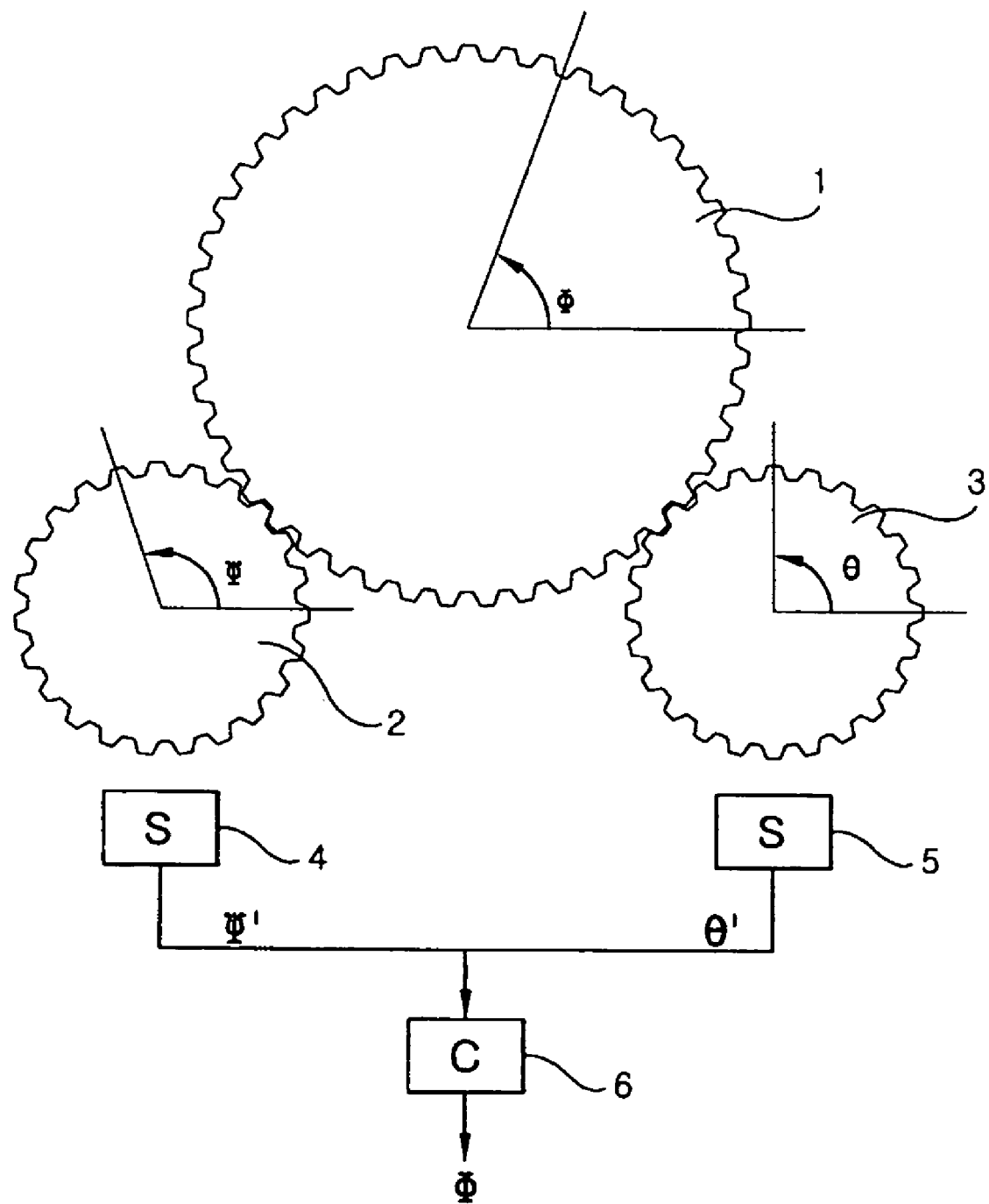

[FIG. 2]
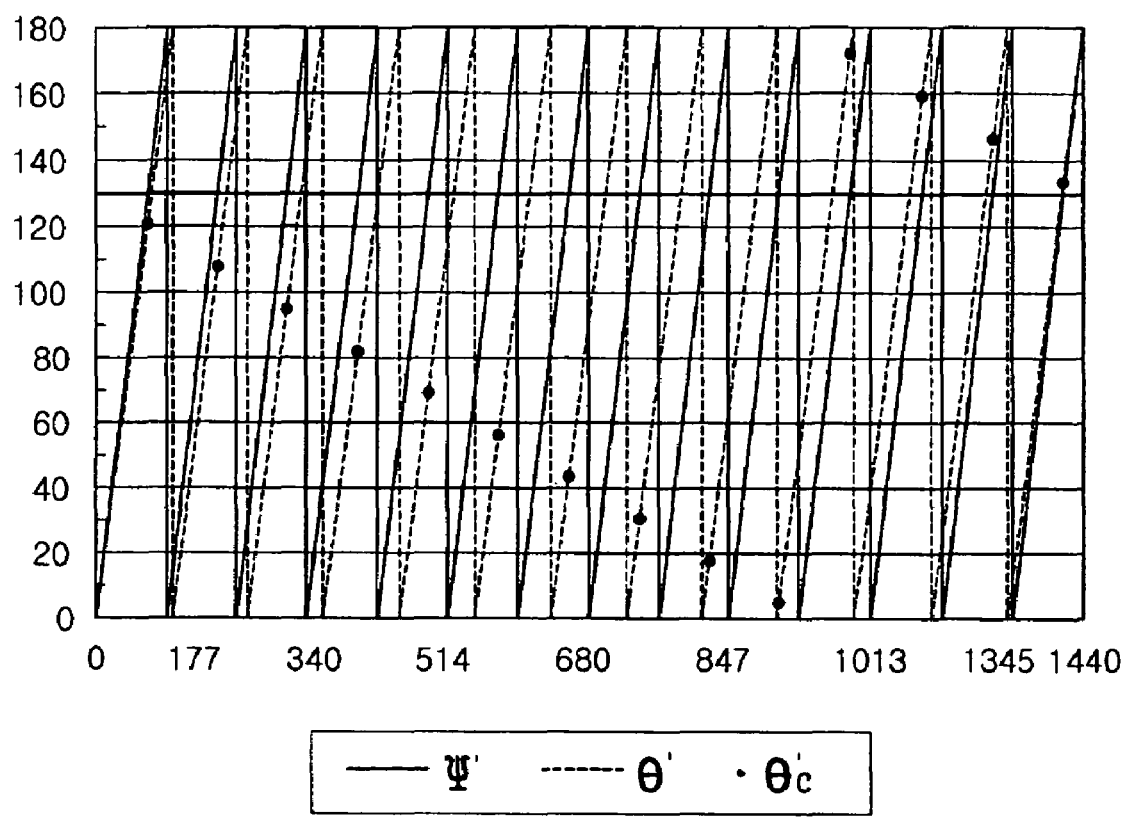

[FIG. 3]
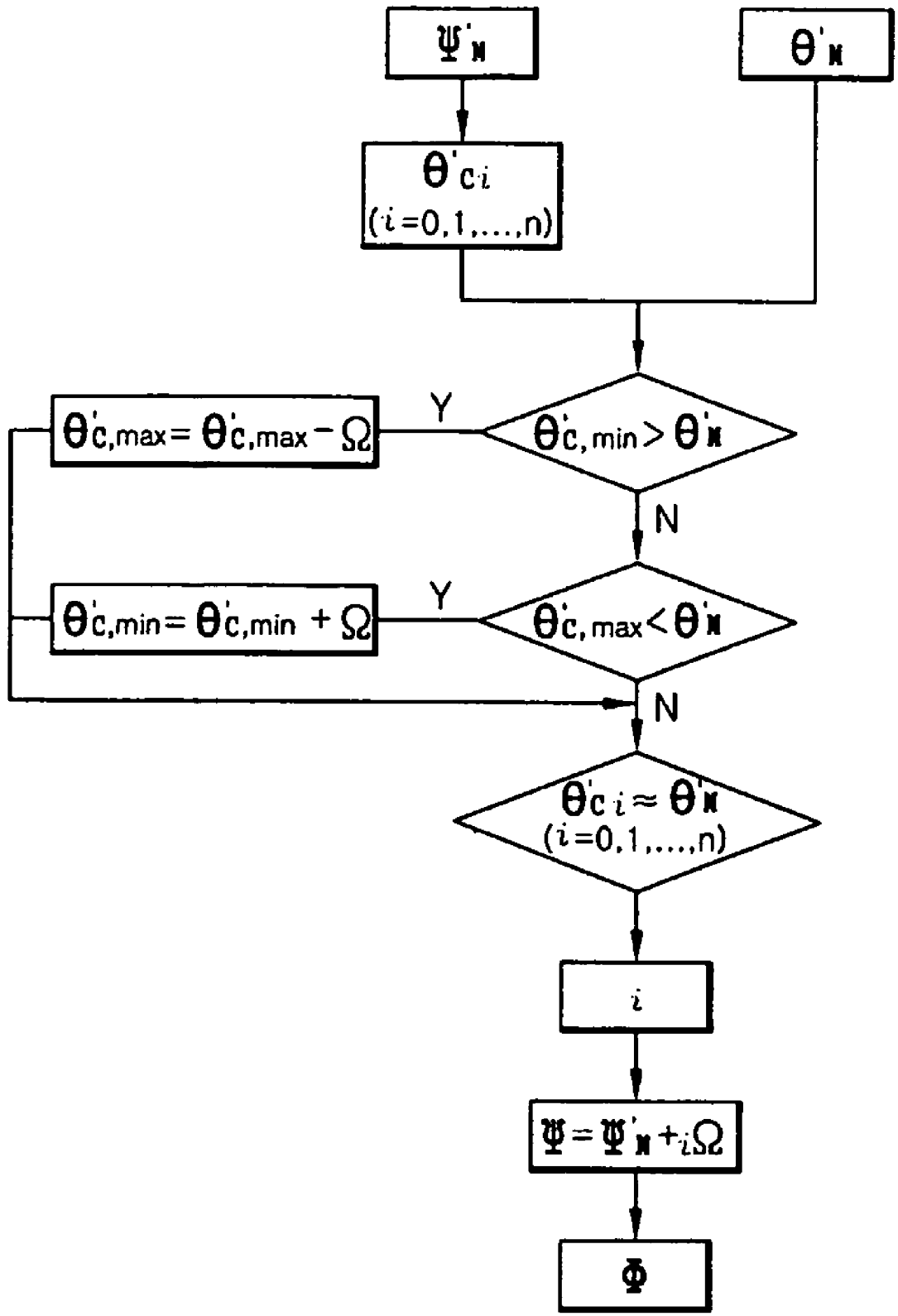

METHOD FOR MEASURING ABSOLUTE STEERING ANGLE OF STEERING SHAFT OF VEHICLE

RELATED APPLICATIONS

The present disclosure relates to subject matter contained in priority Korean Application No. 10-2004-0002902, filed on Jan. 15, 2004, which is herein expressly incorporated by reference in its entirety.

BACKGROUND OF THE INVENTION

1. Field of the Invention

The present invention relates to a method for measuring a steering angle of steering shaft of vehicle, more specially to a method for measuring a steering angle of steering shaft of vehicle, in which the steering angle of the steering shaft is measured by using two rotors rotated at a determined RPM ratio according to the rotation of the steering shaft.

2. Description of the Related Art

When measuring the absolute steering angle of the steering shaft, it is not easy and problematic to measure it just by means of an angle sensor, because its measurement range exceeds 360°.

Besides, when starting a vehicle, the steering angle of the steering shaft has to be measured even though the shaft is located at any angular position.

The method for measuring the absolute steering angle of the steering shaft is already known e.g. in U.S. Pat. No. 5,930,905 and U.S. Pat. No. 6,466,889B1, in which the steering angle is obtained by measuring the rotation angle of first and second rotor rotating at a constant RPM ratio according to the rotation of the steering shaft.

In such arts according to above disclosure, the absolute rotation angle of the first and second rotor can be represented respectively as $\psi=\psi'+i\Omega$ and $\theta=\theta'+j\Omega$, (wherein, $\Omega$ is the measurement range of the angle sensor for measuring $\Psi'$ and $\theta'$, i represents a periodic number of the first rotor as an integer indicating the number in which the absolute rotation angle of the first rotor $\Psi$ exceeds the $\Omega$, and also j represents a periodic number of the second rotor), and for both above American patents, the absolute steering angle $\Phi$ is obtained from the determined process where both $\Psi'$ and $\theta'$ are measured and the measured values are calculated.

According to the U.S. Pat. No. 5,930,905, the $\Psi'$ and $\theta'$ are measured, the measured values are applied to the specific formula (1), as follows, derived from the mutual geometric relation between $\Psi$, $\theta$ and $\Phi$, and then an integer k is obtained by rounding off the value resulting from the formula (1). After that, k, $\Psi'$ and $\theta'$ are applied to the following formula (2), and accordingly, the value of $\Phi$ is obtained.

$$k = \frac{(m+1)\Theta' - m\Psi'}{\Omega} \quad (1)$$

$$\Phi = \frac{m\Psi' + (m+)\Theta' - (2m+1)k\Omega}{2n} \quad (2)$$

(wherein, m is gear tooth number of the first rotor, m+1 is that of the second rotor, and n is that formed on the steering shaft. This steering shaft is geared with the first and the second rotor.)

Meanwhile, according to the U.S. Pat. No. 6,466,889B1, the steering angle $\Phi$ is obtained by using the relation between the difference $\Psi-\theta$ of the absolute rotation angles of two rotors and the periodic number i of the first rotor (it can be the second rotor), and by directly obtaining the i. Herein, if $\Psi'-\theta'$ gained by measurement is negative number, $\Psi-\theta$ is obtained by adding $\Omega$ thereto, otherwise, the value of $\Psi-\theta$ is used as it is. After that, the i is calculated from the relation between $\Psi-\theta$ and i, and the absolute steering angle $\Phi$ of the steering shaft is obtained by using $\Psi$ calculated from $\Psi'$ and i.

At this point, when the steering shaft rotates to the maximum and the i comes to k1, the difference $\Psi-\theta$ of the rotation angle has to be equal to or smaller than $\Omega$ because the measurement range of the angle sensor is $\Omega$. (However, according to the U.S. Pat. No. 6,466,889B1, it is only equal to $\Omega$.). Namely, until the steering shaft rotates to the maximum, the difference $\Psi-\theta$ of the rotation angles changes from 0° to $\Omega$ continuously, and i does from 0 to k1 stepwise.

Herein, in such an art according to the U.S. Pat. No. 6,466,889B1, when the difference $\Psi-\theta$ of the rotation angles changes from 0° to $\Omega$ continuously, it is assumed that i changes from 0 to k1 continuously and a linear proportional relation is established, and the i is obtained by taking the maximum integer smaller than the value which is gained by multiplying $\Psi-\theta$ derived from the measured values of two rotation angles by k1/$\Omega$. For example, if the value obtained by multiplying $\Psi-\theta$ by k1/$\Omega$ is 5.9 . . . , the i comes to 5.

Accordingly, for the method according to the U.S. Pat. No. 6,466,889B1, i–j has to be always 0 or 1 and cannot exceed 2, because the maximum of $\Psi-\theta$ cannot be greater than $\Omega$.

SUMMARY OF THE INVENTION

To solve the above-indicated problems, it is, therefore, an object of the present invention to provide a method for measuring the absolute steering angle of the steering shaft rotating over the range of 360°, wherein the problem, in which the error caused by the measurement error of sensor can come into existence according to all steering angle states of the steering shaft, is eliminated, so that the accurate absolute steering angle for all steering angle states of the steering shaft can be measured.

BRIEF DESCRIPTION OF THE DRAWINGS

The above aspects and features of the present invention will be more apparent by describing certain embodiments of the present invention with reference to the accompanying drawings, in which:

FIG. 1 illustrates one preferred embodiment of the present invention in schematic view;

FIG. 2 illustrates the relation between $\Psi'$ and $\theta'$ according to the steering angle of steering shaft in graphic view; and FIG. 3 illustrates the flowchart of an embodiment of the method for measuring the absolute steering angle of steering shaft according to the present invention.

DETAILED DESCRIPTION OF THE PREFERRED EMBODIMENTS

A method for measuring the steering angle of steering shaft of vehicle according to the present invention uses a first rotor at r1 RPM ratio according to the rotation of the steering shaft and a second rotor at r2 RPM ratio according to the rotation of the steering shaft.

The absolute rotation angle $\Psi$ of the first rotor can be represented as "$\Psi'+i\theta$", that $\theta$ of the second rotor can be as "$\theta'+j\Omega$", and $\Psi'$ and $\theta'$ are measured by an angle sensor. Herein, $\Omega$ represents the measurement range of the angle sensor measuring Ψ' and θ', i does the periodic number of the first rotor as an integer indicating the number in that the absolute rotation angle Ψ of the first rotor exceeds Ω, and also, j does the periodic number of the second rotor. Namely, the absolute rotation angle Ψ of the first rotor can be represented as the sum between a relative rotation angle Ψ' measured by the angle sensor having a measurement range of Ω, and a result obtained by multiplying i by Ω, and the absolute rotation angle θ of the second rotor is done in the same manner as the calculation method of the first rotor.

The measurement range Ω of the angle sensor can be 180°, 360° or another values. Moreover, the sensor can be any kind of one, i.e. contact-type or non-contact-type one, provided that it can measure Ψ' and θ', and preferably, is AMR(Anisotropic Magneto-Resistance) sensor.

According to an embodiment of the present invention, firstly, the measurement values $\Psi_M'$ and $\theta_M'$ of Ψ' and θ' are obtained by using the angle sensor having the measurement range of Ω. Subsequently, a plurality of θ's, which can correspond to $\Psi_M'$, are applied to the relation formula between Ψ' and θ', and accordingly a plurality of $\theta_C$'s are obtained. The periodic number i of the first rotor is obtained by comparing the $\theta_C$'s with $\theta_M'$, and then the absolute rotation angle Ψ of the first rotor is gained by using the i. Finally, the steering angle φ (named as φ1) of the steering shaft is obtained from the relation formula between Ψ and φ.

Herein, if the periodic number i has an error, the φ1 has a greater error. For example, when the periodic number i has an error of "±1", accordingly, the error which the φ1 has, comes to "±(Ω/r1)".

On that reason, it is very important to secure that the error can not be included in the process in which the periodic number i is obtained by comparing a plurality of $\theta_C$'s with $\theta_M'$. So that, according to the present invention, when comparing a plurality of $\theta_C$'s with $\theta_M'$, if the $\theta_M'$ is smaller than the minimum of a plurality of $\theta_C$'s, the maximum of a plurality of $\theta_C$'s is compared with the $\theta_M'$, after Ω is abstracted from the maximum, and if the $\theta_M'$ is greater than the maximum of a plurality of $\theta_C$'s, the minimum of a plurality of $\theta_C$'s is compared with $\theta_M'$, after Ω is added to the minimum.

In the following, the embodiment of the present invention will be described more detailed in conjunction with the accompanying drawings:

As shown FIG. 1, it schematically illustrates a steering shaft 1; a first rotor 2 and a second rotor 3 simultaneously geared with the steering shaft 1; an angle sensor 4 and 5, and an operation circuit 6. In this case, $\Psi_M'$ and $\theta_M'$ measured by both sensors are input into the operation circuit, this performs a prescribed operation and outputs φ as a result.

Herein, the RPM ratio r1 between the steering shaft and the first rotor is 7/4, and that r2 between the steering shaft and the second rotor is 6.5/4. (FIG. 1 is just illustrated to help understanding, therefore is not so accurate as to correspond to the ratios.) FIG. 2 represents the relation between the relative rotation angle Ψ' of the first rotor and that θ' of the second rotor during total 4 rotations of the steering shaft, in graphic view. In this case, the ordinate X represents the steering angle φ, and its' Ω is 180°. FIG. 3 illustrates a flow chart of the process in which the Ψ' and θ' are measured and accordingly the absolute steering angle φ is obtained.

The relation between the relative rotations angles of the first rotor and the second rotor, as shown in FIG. 2, is preferably obtained experimentally by changing the steering angle of the steering shaft and by measuring the relative rotation angle Ψ' of the first rotor and that θ' of the second rotor.

As shown in FIG. 3, the $\Psi_M'$ and $\theta_M'$ are measured by the angle sensor, and a plurality of $\theta_C$'s which can correspond to the $\Psi_M'$ are calculated and obtained from the $\Psi_M'$ by using the relation, as shown in FIG. 2. (In FIG. 3, $\theta_{Ci}'$ represents $\theta_C'$ corresponding to i.). Then, the i is obtained by finding out the nearest to the $\theta_M'$ among a plurality of $\theta_C$'s gained from the above method. For example, if $\Psi_M'$ is 130° and $\theta_M'$ is 105°, corresponding $\theta_C'$ successively comes to 120.7°, 107.9°, 95°, 82.1°, 69.3°, 56.4°, 43.6°, 30.7°, 17.9°, 5°, 172.1°, 159.3°, 146.4° and 133.6°, etc. as shown as a point in FIG. 2, as i increases from 0 to 13. In this way, the nearest value to $\theta_M'$, i.e. 105° among a plurality of $\theta_C$'s is 107.9°, and at the same time i comes to 1.

Accordingly, if the periodic number i and $\Psi_M'$ are used and the steering angle φ1 of the steering shaft is calculated, the result is as follows:

$$\Phi = \frac{1}{r1}(\Psi_M' + i\Omega) = \frac{4}{7}(130° + 180°) = 177° \qquad (3)$$

In an above described method, when measuring the absolute steering angle of, the steering shaft, it is problematic that the actual relative rotation angle θ' is near to 0° or 180°. At this time, if just a little measurement error is included, the great difference between the actual θ' and the measured value $\theta_M'$ can be caused, and consequently the periodic number i can contain a error. Herein, the measurement error can be caused by the mechanical factor, like backlash, or the electrical one, like noise.

For example, when it is assumed that the actual relative rotation angle Ψ' of the first rotor is 130° and that θ' of the second rotor is 5° and that the value measured by the angle sensor comes to 178° because $\Psi_M'$ is 130° and $\theta_M'$ contains the measurement error, the nearest value to the 178° among a plurality of $\theta_C$'s which can correspond to $\Psi_M'$ of 130°, is obtained when $\theta_C'$ is 172.1°, and the i comes to 10. And, when calculating φ1 of those conditions by using the formula (3), φ1 comes to 1102.9°.

But, if the measurement error is not included, the $\theta_M'$ will be 5° and the i will be 9. Besides the accurate φ1 will come to 1000°. Namely, because the measurement error is included in $\theta_M'$, the calculated steering angle comes to have an error by 102.9°(=Ω/r1).

To solve the above problem, the present invention has additional steps: to subtract or add Ω from or to the calculated values $\theta_C$'s, and to correct the $\theta_C$'s between the steps: to gain the $\theta_C$'s and to obtain the periodic number i of the first rotor.

Moreover, on correcting the $\theta_C$'s, if $\theta_M'$ is smaller than the minimum among a plurality of $\theta_C$'s, the maximal $\theta_C'$ is corrected by subtracting Ω from the maximum among a plurality of $\theta_C$'s, and if the $\theta_M'$ is greater than the maximum among a plurality of $\theta_C$'s, the minimal $\theta_C'$ is done by adding Ω to the minimum among a plurality of $\theta_C$'s.

For example, when it is assumed that the actual relative rotation angle Ψ' of the first rotor is 130° and that θ' of the second rotor is 5° and that the value measured by the angle sensor comes to 179.5° because $\Psi_M'$ is 130° and $\theta_M'$ contains the measurement error, a plurality of $\theta_C$'s which can correspond to $\Psi_M'$ of 130°, successively come to 120.7°, 107.9°, 95°, 82.1°, 69.3°, 56.4°, 43.6°, 30.7°, 17.9°, 5°, 172.1°, 159.3°, 146.4° and 133.6°, etc. as the i increases from 0 to 13. In this situation, when comparing $\theta_M'$ of 179.5° with a plurality of $\theta_C$'s, the minimum, 5°, among a plurality of $\theta_C$'s is compared after adding Ω of 180° thereto, because $\theta_M'$ is greater than the maximum, 172.1°, among the θ's. And then, the nearest $\theta_C'$ to the $\theta_M'$ is 5° and the i comes to 9.

Meanwhile, when it is assumed that the actual relative rotation angle $\Psi'$ of the first rotor is 134° and that $\theta'$ of the second rotor is 175.9° and that the value measured by the angle sensor comes to 1° because $\Psi_M{}'$ is 134° and $\theta_M{}'$ contains the measurement error, a plurality of $\theta_C$'s which can correspond to $\Psi_M{}'$ of 134°, can be obtained from the relation of FIG. 2, and successively come to 124.4°, 111.6°, 98.7°, 85.9°, 73°, 60°, 47°, 34°, 21.6°, 8.7°, 175.9°, 163°, 150° and 137.3°, etc. as the i increases from 0 to 13. In this situation, when comparing $\theta_M{}'$ of 1° with a plurality of $\theta_C$'s, the minimum, 175.9°, among a plurality of $\theta_C$'s is compared after subtracting $\Omega$ of 180° the minimum, because $\theta_M{}'$ is smaller than the minimum, 8.7°, among the $\theta$'s. And then, the nearest $\theta_C{}'$ to the $\theta_M{}'$ is 175.9° and the i comes to 10.

As shown in both above examples according to the present invention, it can be verified that the i is obtained as an accurate value having no error even though the measurement error is included in $\theta_M{}'$. Then, the absolute steering angle of the steering shaft without great error can be gained by applying the i accurately obtained in the above-described manner to the formula (3).

The method for measuring the absolute steering angle of the steering shaft according to the present invention has the following advantages:

Above all, more accurate absolute steering angle can be gained, because "$\Psi-\theta$" is not used on obtaining the periodic number i of the first rotor.

Secondly, the absolute steering angle of the steering shaft can be obtained as an accurate value having no error, because the periodic number i of the first rotor doesn't contain the error (e.g. error of ±1) caused by the measurement error.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method for measuring an absolute steering angle $\phi$ of a steering shaft of a vehicle by using a first rotor and a second rotor respectively rotating at a determined RPM ratio according to the rotation of the steering shaft, the method comprising:

obtaining a measured angle $\Psi_M{}'$ and a measured angle $\theta_M{}'$ respectively by measuring a relative rotation angle $\Psi'$ of the first rotor and a relative rotation angle $\theta'$ of the second rotor with an angle sensor having a measurement range of $\Omega$;

obtaining values of calculated angles $\theta_C$'s by calculating a plurality of relative rotation angles $\theta$'s which correspond to the $\Psi_M{}'$, wherein the calculations are based upon a functional relation defined by the relative rotation angle $\Psi'$ of the first rotor and the relative rotation angle $\theta'$ of the second rotor;

obtaining a periodic number i of the first rotor by comparing a plurality of the calculated angles $\theta_C$'s with the $\theta_M{}'$; and obtaining the absolute steering angle of the steering shaft from a functional relation defined by $\Psi$ and $\phi$ after gaining the absolute rotation angle $\Psi$ of the first rotor by using the i.

2. The method for measuring according to claim 1, further comprising correcting the $\theta_C$'s by subtracting or adding $\Omega$ from or to the $\theta_C{}'$, intermediate obtaining the calculated values $\theta_C$'s and obtaining the periodic number i of the first rotor.

3. The method according to claim 2, wherein the the correction corrects the maximal $\theta_C{}'$ by subtracting the $\Omega$ from the maximal $\theta_C{}'$ among a plurality of $\theta_C$'s, if the $\theta_M{}'$ is smaller than the minimal $\theta_C{}'$ among a plurality of $\theta_C$'s.

4. The method according to claim 2, wherein the the correction corrects the minimal $\theta_C{}'$ among a plurality of $\theta_C$'s by adding the $\Omega$ to the minimal $\theta_C{}'$, if the $\theta_M{}'$ is greater than the maximal $\theta_C{}'$ among a plurality of $\theta_C$'s.

5. The method according to claim 1, wherein the the correction corrects the maximal $\theta_C{}'$ among a plurality of $\theta_C$'s by subtracting the $\Omega$ from the maximal $\theta_C{}'$, if the $\theta_M{}'$ is smaller than the minimal $\theta_C{}'$ among the a plurality of $\theta_C$'s, and to correct the minimal $\theta_C{}'$ among the plurality of $\theta_C$'s by adding the $\Omega$ to the minimal $\theta_C{}'$, if the $\theta_M{}'$ is greater than the maximal $\theta_C{}'$ among the plurality of $\theta_C$'s.

6. The method according to claim 1, wherein the values of the calculated angles $\theta_C$'s are predetermined, the values of the calculated angles $\theta_C$'s being obtained by changing steering angles of the steering shaft and measuring corresponding angles of the first and second rotors.

7. The method for measuring the absolute steering angle according to claim 1, wherein the absolute steering angle $\phi$ of the steering shaft is defined by the equation:

$\phi = 1/r1(\Psi_M{}' + i\Omega)$, and r1 defines a RPM ratio of the steering shaft to the first rotatable body.

* * * * *